April 11, 1961

R. M. TUCK ET AL

2,978,928

TRANSMISSION

Filed May 6, 1957

INVENTORS
Robert M. Tuck &
Mark E. Fisher
BY W. C. Middleton
ATTORNEY

April 11, 1961  R. M. TUCK ET AL  2,978,928
TRANSMISSION
Filed May 6, 1957  6 Sheets-Sheet 6

Fig. 7

INVENTORS
Robert M. Tuck &
Mark E. Fisher
BY W. C. Middleton
ATTORNEY

United States Patent Office 2,978,928
Patented Apr. 11, 1961

2,978,928
TRANSMISSION

Robert M. Tuck, Indianapolis, and Mark E. Fisher, Carmel, Ind., assignors to General Motors Corporation, Detroit, Mich., a corporation of Delaware Filed May 6, 1957, Ser. No. 657,432

25 Claims. (Cl. 74—645)

This invention relates to a transmission and more particularly to a semi-automatic multiratio transmission.

This transmission includes in the drive train a torque converter and a lock-up clutch which may be alternately employed to provide torque multiplication or a direct drive, in combination with a multiratio gear unit providing four forward ratios and two reverse ratios. The torque converter provides additional torque multiplication and reduces shock loads during starting, high performance driving, and ratio changes in the multiratio transmission unit. The semi-automatic control system provides, on the selection of a drive ratio except in first and the reverse ratios, automatic controls to engage the lock-up clutch when the vehicle reaches a certain preselected cruising speed, and thereafter to disengage the lock-up clutch during ratio changes. The lock-up clutch engaging system is disengageable in the first forward ratio and both reverse ratios by venting the governor pressure. The main line pressure is regulated by a regulator valve responsive to governor pressure and a signal pressure effective in first and both reverse ratios and controlled by a manual and relay valve to provide four forward ratios and two reverse ratios. A hydrodynamic brake driven by the converter output shaft also provides effective downhill braking.

An object of the invention is to provide in an automatic transmission having a torque converter, a lock-up clutch, a two ratio gear unit and a three ratio gear unit, an automatic control system effective to provide four forward ratios and two reverse ratios and to engage the lock-up clutch automatically during certain forward ratios and disengage the lock-up clutch during certain ratio changes.

Another object of the invention is to provide in an automatic control system for a transmission having a lock-up clutch, a governor and ratio change gearing, a control to engage the lock-up clutch responsive to speed and a control responsive to a ratio change to discontinue the action of the speed control on the lock-up clutch control.

Another object of the invention is to provide in a multiratio semi-automatic transmission a manual control effective with a relay valve to select a plurality of ratios.

Another object of the invention is to provide in an automatic transmission control system, a source of fluid pressure, variable in accordance with the transmission speed and selected position of the manual ratio contol.

Another object of the invention is to provide in a control system for a hydrodynamic brake to limit the torque absorbed by the brake and to limit the pressure brake system.

These and other objects of the invention will be more apparent from the following description and drawings of the preferred embodiment.

Figures 1, 2:
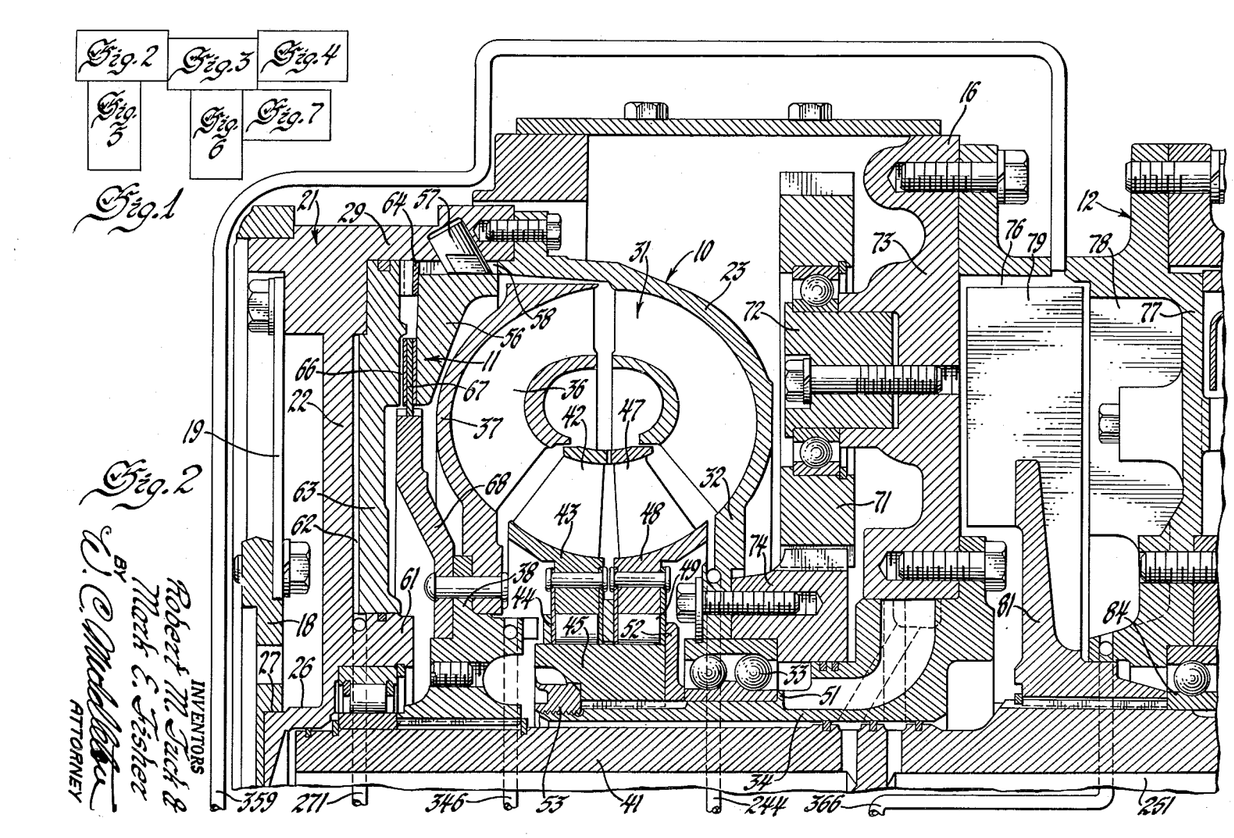
Figures 2 to 7 when arranged in accordance with Figure 1 show the transmission assembly and the control system therefor.
Figure 3:
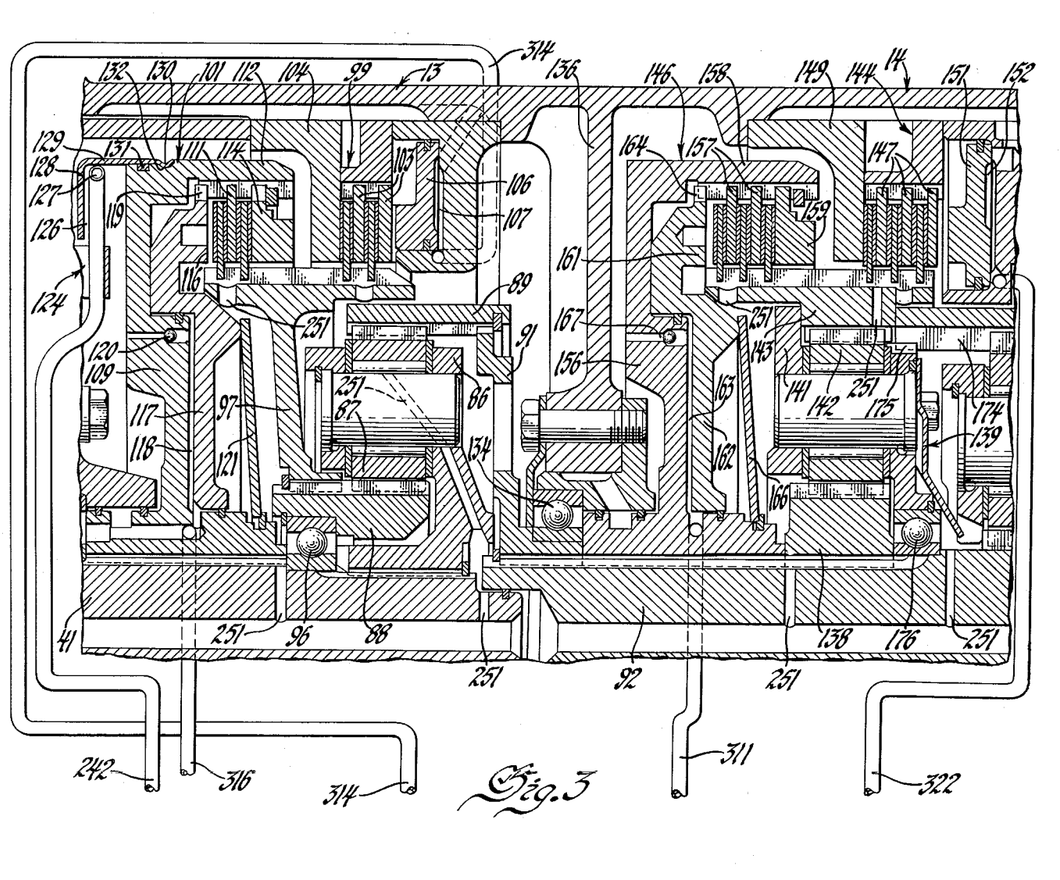
Figures 4, 4A:
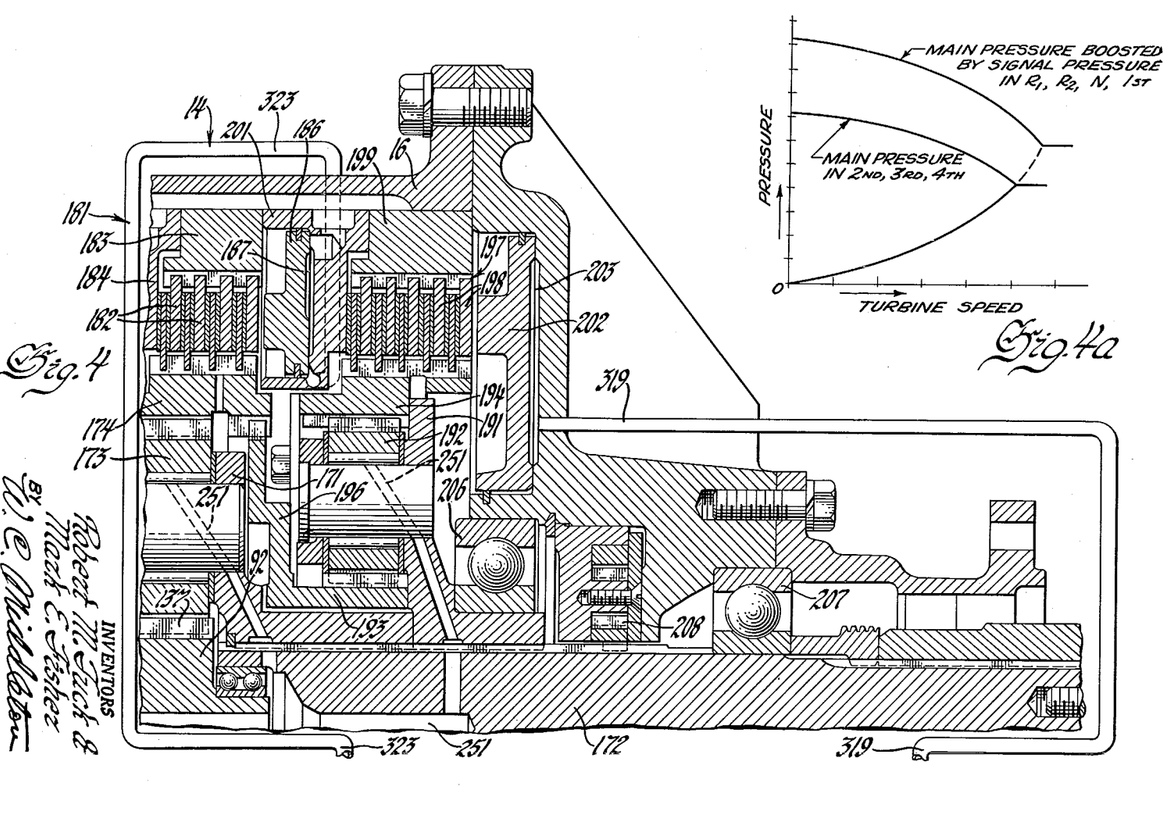
Figure 4A shows main and governor pressure curves.

The transmission drive train shown in Figures 2, 3, 4 includes a torque converter 10, a lock-up clutch 11, a hydrodynamic brake 12, a two speed gear unit 13, and a three speed and reverse gear unit 14, all located in the transmission housing 16. Referring to Figure 2 the engine shaft is connected to the input hub 18 which drives, through the flex plate 19, the torque converter housing 21 which is formed in two parts, a forward section 22 and a rear section 23. The forward section 22 has at its center line a forwardly projecting pilot shaft portion 26 fitting into the pilot bearing bore 27 in the input hub 18 to provide rotatable bearing support for the forward end of the converter housing 21. The forward section 22 also has a rearwardly extending flange 29 at its outer periphery suitably secured to the rear section 23, which has a curved portion to which the converter pump blades 31 are attached and a hub 32 which is supported by the radial and thrust bearing 33 on a ground sleeve 34 secured to the transmission housing 16. The torque converter pump blades 31 circulate the fluid counterclockwise to the turbine blades 36 mounted on the turbine element 37 which is secured to an output hub 38 splined to the converter output shaft 41. When the fluid leaves the turbine blades 36 it is redirected during high torque multiplication by the first stator blades 42 mounted on the first stator element 43 which is connected by a one-way clutch 44 to a hub 45 splined to the ground sleeve 34. The fluid is, during all torque multiplication, redirected by the second stator blades 47 mounted on the second stator element 48 which is connected by one-way clutch 49 to the hub 45. The bearing 33 and hub 45 are axially positioned on the ground sleeve 34 by the shoulder 51 on the ground sleeve, the spacer ring 52 and the ring 53 threaded on the ground sleeve.

The lock-up clutch 11 has a fixed plate 56 rotatably and axially secured by a key 57 in the flange 29 of the front section 22 and a shoulder 58 on the rear section 23. The front section 22 also has between the outer flange 29 and an integral inner ring 61, an annular cylinder 62 for the lock-up clutch piston 63. The annular undulated retraction spring 64 is located between the fixed plate 56 and the piston 63 to assist the hydraulic pressure in the converter chamber returning the piston 63. The piston 63 has a pressure plate portion 66 which engages the driven clutch plate 67 between itself and the fixed plate 56 to engage the lock-up clutch. The driven plate 67 is suitably splined to the clutch hub 68 which is connected to the output hub 38 and output shaft 41.

The input pump 216 and any other engine driven accessories may be driven by a spur gear 71 rotatably mounted on a shaft 72 fixed to partition 73 and driven by a ring gear 74 secured to the hub 32 of the torque converter housing 21. The partition 73 also provides support for the ground sleeve 34.

The hydrodynamic brake unit 12 is located between the torque converter 10 and the front or two speed gear unit 13 in a chamber 76 provided in the transmission housing 16 between the partition 73 on the torque converter side and the partition 77 on the gear unit side. The partition 77 has integrally formed therewith or secured thereto an annular series of radial vanes 78 which provide the stator element of the hydrodynamic brake. The rotor element of the hydrodynamic brake consists of an annular series of radial vanes 79 mounted on a hub 81 secured to the torque converter output shaft 41.

The converter output shaft 41 passes through the partition 77 on which it is rotatably and axially supported by the thrust bearing 84 to drive the two speed gear unit 13 illustrated in Figure 3. This single planetary type gear unit has a carrier 86 splined to the shaft 41 to provide the input element for this gear unit. The carrier has a plurality of planetary pinions 87 which mesh with a sun gear 88 and a ring gear 89 which is suitably connected by a hub 91 to the intermediate shaft 92 or output member of this gear unit. The sun gear 88 is rotatably mounted on the shaft 41 by a thrust bearing 96 and connected by a gear spline to the control hub 97 which may be stopped by the overdrive ratio establishing device or brake 99 to provide an overdrive ratio or connected to the shaft 41 by a direct drive ratio establishing device or clutch 101 to provide direct drive in this gear unit. The brake 99 has a set of plates 103, consisting of alternate fixed plates splined to the housing 16 and moving plates splined to the hub 97, located between a fixed abutment 104 formed as a portion of the housing 16 and the annular piston 106 located in a cylinder 107 formed in a portion of the housing 16. Since the piston engages a non-rotatable brake plate it is not necessary to provide the usual stop member such as a pin to prevent rotation of the piston 106 and the other ratio establishing device or brake pistons described below. A return spring, not shown, returns the piston to the released position. The direct drive clutch 101 is mounted on hub 109 splined to shaft 41 and has a set of plates 111, consisting of driven plates splined to the hub 97 and drive plates splined to an axial flange portion 112 of the hub 109, located between a fixed abutment 114 and an applying face 116 on the annular piston 117 located on the stepped cylinder 118 formed on the adjacent side of the hub 109. The piston 117 has a spline 119 at its outer diameter connected to the splines on the flange 112 so that the piston rotates with the hub 109. The cylinder 118 is located radially within the applied portion 116 of the piston 117 so that the centrifugal effect which produces a pressure gradient in rotating fluid motors of this type is minimized. The piston 117 is returned by the belleville type retraction spring 121 which engages an annular abutment on the piston 117 and hub 109. The drain valve 120 opens under the influence of centrifugal force in the absence of full line pressure to rapidly drain the cylinder 118 when the supply to the cylinder is cut off and is closed by full line pressure during clutch application.

The pitot governor 124 has an annular chamber 126 which rotates with the hub 109 and shaft 41. Fluid is supplied to the chamber by line 253, which has a terminal end located to spray fluid through the opened internal side of the chamber, and retained in the chamber by centrifugal force. The fluid rotates with the chamber toward the open end of the pitot tube 127 to provide a governor pressure proportional to the speed of shaft 41. The chamber 126 is formed by an L shaped annular member 128 having a cylindrical portion 129 which is forced over the cylindrical surface of the flange 112 of hub 109, seats against the seal 131 to seal the chamber and the bead 130 fits in a recess 132 to lock member 128 to the hub 109.

The intermediate shaft 92 connects the front unit 13 to the rear or three speed unit 14, is rotatably supported by a thrust bearing 134 in a partition 136 between these gear units, and drives a first sun gear 137 and the second sun gear 138 of the compound planetary three speed unit 14 shown in Figures 3 and 4. The second planetary gear set 139 has a carrier 141 carrying a plurality of planetary pinions 142 which mesh with the second sun gear 138 and the ring gear 143. The ring gear 143 is controlled by a ratio change device or brake 144 to provide intermediate ratio and by a direct drive ratio establishing device or clutch 146 to provide direct or high ratio in this unit. The brake 144 has a set of plates 147 with alternate rotating plates splined to the ring gear 143 and intermediate fixed plates splined to the housing 16 which are located between a fixed abutment 149 secured to the housing and an annular piston 151 located in a cylinder 152 formed in a portion of the housing 16. Since the piston 151 engages a fixed plate it is not necessary to provide means to prevent rotation. Retraction springs, though not shown, are employed to return the piston to the released position.

The direct drive clutch 146 is located in a hub 156 splined to the intermediate shaft 92. This clutch has a set of plates 157 having alternate plates splined to the ring gear 143 and intermediate plates splined to the cylindrical flange 158 formed as an extension at the outer diameter of the hub 156. The set of plates is located between a fixed abutment 159 secured to the flange 158 and a pressure plate portion 161 of the piston 162 which is located in an L shaped cylinder 163 formed on the adjacent base of the hub 156. The splines 164 at the outer diameter of the piston 162 mesh with the splines on the flange 158 to prevent rotation of the piston with respect to the hub 156. The belleville type spring 166 is anchored to the hub 156 and engages the piston to return the piston. A centrifugal valve 167 similar to the valve 120 permits rapid evacuation of the cylinder 163.

The first planetary gear set, shown in Figure 4, of the three speed compound planetary unit 14 has a carrier 171 which is splined to the output shaft 172 and carries a plurality of planetary pinions 173 meshing with the sun gear 137 and the ring gear 174. The ring gear is connected by gear spline 175 to the carrier 141 which is rotatably supported by the thrust bearing 176 on the intermediate shaft 92. The ring gear 174 is retarded to provide low ratio in the three speed unit by a ratio change or establishing device or brake 181 which has a set of plates 182 having alternate plates splined to the ring gear 174 and intermediate plates splined to a portion 183 on the housing 16. This set of plates 182 is located between a fixed abutment 184 and a piston 186 located in cylinder 187. Since this piston engages a fixed plate it is not necessary to provide means to stop rotation of the piston. Suitable coil type retraction springs not shown return the piston to disengage the clutch.

The reverse gear unit has a carrier 191 splined to the output shaft 172 and carrying planetary pinions 192 meshing with the sun gear 193 and the ring gear 194. The sun gear 193 has a hub 196 extending radially outward and having a spline connection to the ring gear 174 which provides a unitary assembly consisting of the sun gear 193, the ring gear 174 and the carrier 141. The ring gear 194 is stopped to provide reverse by the reverse ratio establishing device or brake 197 which has a set of plates 198 with alternate plates splined to the ring gear 194 and intermediate plates splined to a portion 199 of housnig 16. The plates are located between the fixed abutment 201 and a piston 202 and in a cylinder 203. The output shaft 172 is supported in thrust bearings 206 and 207 and drives the output pump 208.

The front or two speed unit provides a direct drive and overdrive which when used in combination with each of the three forward ratios and reverse provided in the rear or three speed unit 14 produces a transmission capable of providing six forward speeds and two reverse ratios. In the front unit 13 the direct drive is provided by engaging the direct drive clutch 101 which connects the converter output shaft 41 and the sun gear 88 together to lock up the planetary gear unit to provide direct drive which is the lower ratio. An overdrive ratio is provided by engaging the ratio establishing device or brake 99 which holds the sun gear stationary so that the input carrier 86 drives the output ring gear 89 at an overdrive ratio. In the rear unit when the low brake 181 is engaged to hold the ring gear 174 the input sun gear 137 drives the planetary carrier 171 and output shaft 172 at a low ratio. When the intermediate brake 144 is engaged the ring gear 143 is held stationary so that the intermediate shaft 92 and sun gear 138 drive the planetary carrier 141 forwardly at a reduced speed, and this carrier drives the ring gear 174 which in combination with the intermediate shaft 92 driven sun gear 137 rotates the carrier 171 at an intermediate ratio. High ratio or direct drive in the rear unit 14 is provided by engaging clutch 146 which connects the intermediate shaft 92 to the ring gear 143 to provide a direct drive. Reverse drive is provided by engaging brake 197 to hold the ring gear 194. Then the sun gear 137 drives the ring gear 174 reversely since the carrier is stationary or moving reversely to impart a reverse drive to the sun gear 193 which drives the carrier 191 and output shaft 172 at a reduced reverse ratio. It will be appreciated that only one ratio engaging device is applied in each unit to provide one drive ratio in each unit and that the other ratio engaging devices must all be disengaged. Though this gearing on the application of one ratio engaging device in the rear unit to provide either high, intermediate, low or reverse ratios and one ratio engaging device in the front unit to provide either direct drive or overdrive can provide six forward ratios and two reverse ratios, the controls are arranged so that only four forward ratios and two reverse ratios are provided.

*Hydraulic controls*

The hydraulic control system for this transmission provides for manual selection of four forward ratios and two reverse ratios. The four forward ratios are obtained by employing in combination with direct drive in the two speed unit, low, intermediate and high ratio in the three speed unit and by employing overdrive in the two speed unit in combination with high or direct drive in the three speed unit. The two reverse ratios are obtained by employing in combination with reverse and the three speed unit either direct drive or overdrive in the two speed unit. In addition automatic controls are provided in order to obtain speed responsive engagement of the direct drive clutch while operating in the second and third and fourth ratios and automatic disengagement during a ratio change interval between these ratios. The hydrodynamic brake is controlled by a manual valve to apply and release the brake which automatically limits the pressure in the hydrodynamic brake chamber and thus the braking torque of the brake.

The fluid for this control system is supplied by an output pump 208 driven by the output shaft 172 which draws fluid from the sump line 209 and delivers the fluid through check valve 211 to branch 212 of supply line 214 and by an input driven pump 216 driven by the gear 71 which supplies fluid from sump line 217 to supply line 214. The supply line 214 is connected to a chamber 218 in the body of the regulator valve 221. Fluid from the chamber 218 normally flows through the filter 222 to the inlet chamber 223 but if there is an excessive pressure drop through the filter the fluid will pass directly from the supply chamber 218 to the inlet chamber 223 through the relief valve 226.

The regulator valve element 227 has lands *a* and *b* of equal diameter located in the bore 228. The valve element 227 is normally biased to the position shown by a spring 229 between the valve and a movable control abutment 231 which will be described below and located in bore 232 in land *a*. The supply line 214 is always connected through the filter 222 or relief valve 226 and chamber 223 to port 233 to continuously supply main line 234 and the space between lands *a* and *b*. This space is always connected to passage 236 having a check valve 237 therein permitting flow of fluid from the port 233 to the bore 228 between the land *b* and the end wall 238 of the bore 228. The fluid in the bore acts on the unbalanced area of land *b* so that the valve regulates the pressure in the main line. The check valve 237 in cooperation with a small clearance between the land *b* and the bore 228 damps the action of the regulator valves more fully explained in application S.N. 551,068, filed December 5, 1955, by Ulysses A. Breting and Robert M. Tuck. A reduced portion 239 of the valve element 227 extends through an aperture in wall 238 into a chamber 241 communicating with the pitot governor line 242 so that the governor pressure acts on the valve element to decrease main line pressure with increasing governor pressure. As the main line pressure in line 234 increases the valve element 227 will be moved to the left to exhaust fluid to port 243 which is connected by converter line 244 to supply the torque converter.

Figure 5:
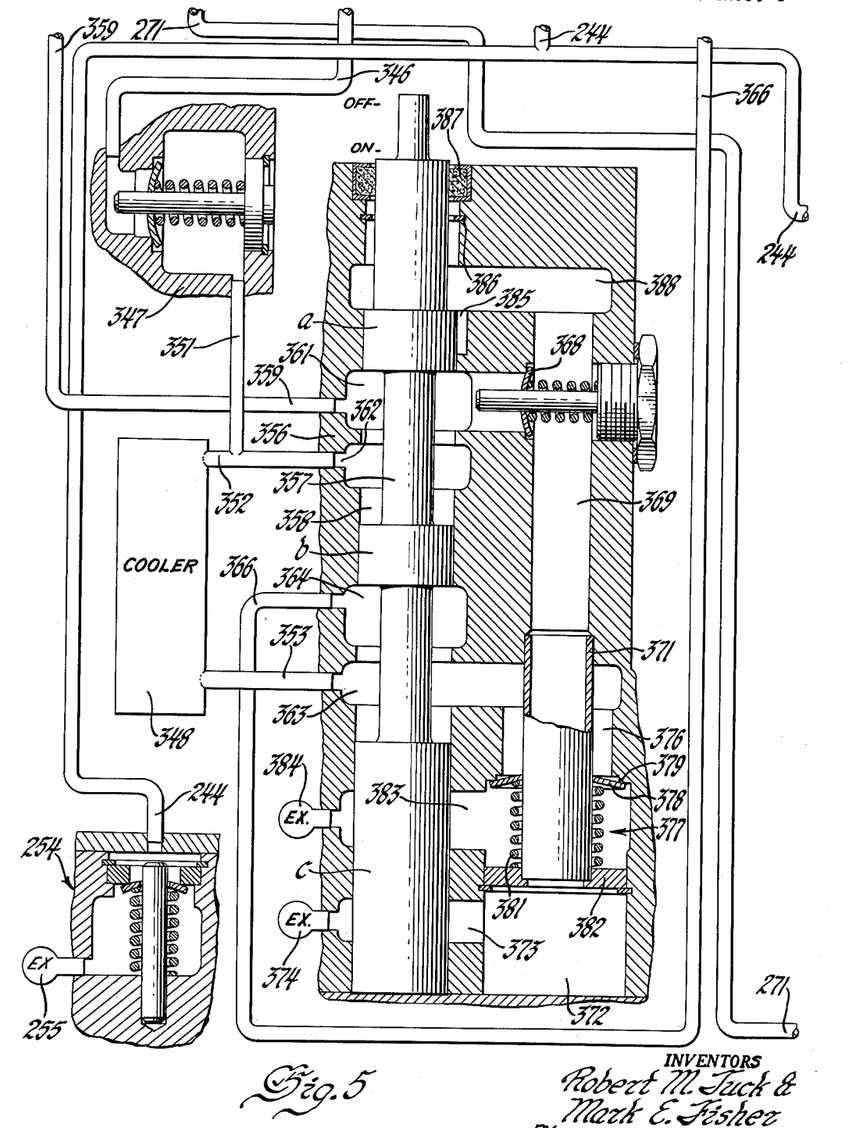
Figure 6:
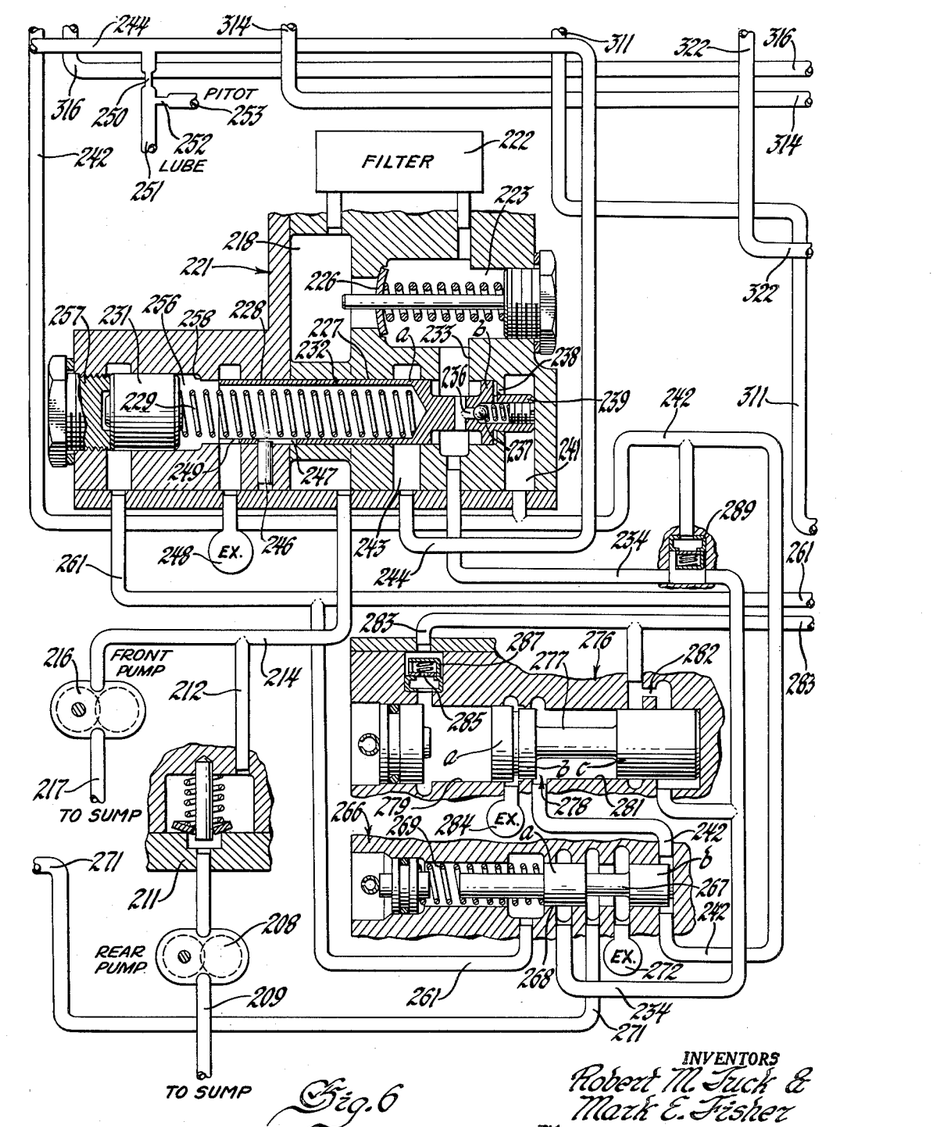

The converter line 244 in addition to supplying fluid to the torque converter also supplies fluid through orifice 250 (Figure 6) to the lubrication line 251 and from lubrication line 251 through orifice 252 to the pitot governor feed 253 to supply the pitot governor chamber 126. The lubrication line 251 is connected as shown in Figures 2, 3 and 4 to a central bore in each of the transmission shafts and by branches to each of the planetary gear sets. The converter line 244 is also connected to a safety valve 254 (Figure 5) which limits unusual excess pressure in the converter and exhausts the excess fluid through the exhaust 255.

The movement of valve element 227 is limited by a pin or screw 246 fixed in the valve body which extends into a slot 247 in the land *a* to prevent valve element portion 239 moving out of the aperture in wall 238 which would interconnect main line 234 and governor line 242. The exhaust 248 and slot or port 249 in land *a* always connect the space between abutment 231 and the valve element 227 to exhaust. The control abutment 231 of regulator valve 221 is located within a large bore portion 256 of the bore 228 for limited movement between end plug 257 and shoulder 258 and is moved from the position shown by fluid supplied from the signal line 261. When the transmission is operating in the first forward ratio, neutral, and both reverse ratios, the control abutment 231 is moved from the position shown to abut shoulder 258 to increase the spring force on the valve element 227 to provide pressure regulation at a higher level. The main line 234 supplies regulated pressure to the lock-up shift valve 266 and the flow valve 276.

The lock-up shift valve 266 has a valve element 267 having lands *a* and *b* of uniform diameter located in the bore 268 in the valve body. The bore is closed at both ends and a spring 269 located in one end of the bore urges the valve to the closed position shown in which the land *a* blocks the main line 234 and connects lock-up clutch line 271 to exhaust 272. The governor line 242 supplies fluid at a pressure proportionate to the output speed of the torque converter to the other end of the bore 268 where the fluid acts on the valve element 267 to move the valve to the lock-up position in which line 234 is connected between the lands *a* and *b* to the lock-up clutch line 271 and the land *b* closes the exhaust 272. The signal line 261 is connetced to the spring chamber portion of the bore 268 and acts on the end of land *a* to hold the valve element 267 in the closed position when the signal line is energized in first ratio, neutral and both reverse ratios.

Main line 234 is also connected to the flow valve 276 which has a valve element 277 having land *a* of large diameter and a narrow land *b* of small diameter closely adjacent land *a* and a second land *c* of the same small diameter substantially spaced from the other lands. The valve element 277 is slidably mounted in a bore 278 having a large diameter portion 279 fitting land *a* and small diameter portion 281 fitting lands *b* and *c*. The overall length of the lands *b* and *c* is substantially equal to the length of the small bore portion 281. The width of land *b* is substantially equal to the width of port 284. The main line 234 is connected freely around land *c* and through an orifice 282 to the ratio change line 283. The main line 234 is also connected to the end valve bore 281 to act on the land *c* to move the valve to the left to the exhaust position in which a continuation of the governor line 242 is conneced to exhaust 284 venting the governor line and making the governor ineffective to lock up the lock-up clutch or to hold it in the lock-up position. To prevent fluid lock during this movement of the valve the space between lands *a* and *b* is connected to exhaust 284. In the normal position shown the land *b* of valve 277 blocks the exhaust so that the pressure in governor line 242 reflects engine converter output speed. The valve 277 is moved to the exhaust position whenever there is flow from the main line 234 to the ratio change line 283 through orifice 282. This occurs during each ratio change when a fluid motor is filled to engage a clutch. When the clutch engagement is completed the flow through line 283 ceases and a pressure in lines 283 and 234 equalizes since there is no flow through orifice 282. Fluid is also supplied through the orifice 285 in the check valve 287 to fill the bore 279 so the same pressure acts on both ends of the valve 277. Since the land *a* is larger than the land *c* the valve element will be moved to the right or closed position. The orifice 285 delays the flow of fluid from line 283 to the valve bore 279 to delay movement of valve 277, sufficiently, so that the ratio change device is fully engaged before the lock-up clutch is again engaged. The check valve 287 permits rapid exhaust of the bore portion 279 as the flow valve moves from the closed to the exhaust position so that the lock-up clutch will be disengaged quickly as the shift is initiated so that during the entire period of the shift the converter will be effective to absorb any shift load shocks.

The check valve 289 located between the main line 234 and the governor line 242 prevents governor pressure from exceeding the main line pressure by exhausting governor fluid to the main line when governor pressure exceeds main line pressure. This is effective as a safety measure to prevent excessive pitot governor pressure at high speeds and to limit the reduction of main line pressure as explained below.

The ratio change line 283 supplies the manual valve 291 which has a valve element 292 having lands *a*, *b*, *c* and *d* of uniform diameter located in a bore 293 having a closure 294 at one end. Valve element 292 has a central passage 296 connecting the space between the lands *c* and *d* with the space between the lands *a* and *b* and a plurality of grooves 297 cooperating with a ball detent mechanism 298 to resiliently position the valve in each of the four forward ratio positions, neutral and both reverse positions.

The manual valve 291 operates in conjunction with the relay valve 301 to supply fluid to the clutches of the two speed unit. Relay valve 301 has a valve element 302 having lands *a*, *b* and *c* of uniform diameter located in a bore 303 which is closed at both ends. At one end of the valve 302 a spring 304 is located in the spring chamber portion 305 of the bore to urge the valve to the normal position illustrated. A fluid chamber 306 at the other end of the valve moves the valve to the R2 position. The spring chamber 305 is smaller to provide a shoulder limiting movement of the valve 302 and has an exhaust 307 to prevent the accumulation of fluid in the spring chamber.

The manual valve 291 and the relay valve 301 function together to supply fluid in accordance with the position of the manual valve to the proper ratio change clutch motors to condition the transmission for drive in the selective ratio. When the manual valve 291 is in the fourth ratio position shown in Figure 7 the ratio supply line 283 is connected between lands *c* and *d* of valve element 292 to the high ratio line 311 and the overdrive supply line 312 which is connected to the relay valve 301 between the lands *a* and *b* of valve element 302 to the overdrive ratio line 314. The other ratio lines are exhausted. The direct drive ratio line 316 is connected between the lands *b* and *c* of valve 302 to a branch 317 of the front unit feed line 318 and through the bore 293 to the right of valve element 292 to exhaust 299. The signal line 261, the reverse ratio line 319 and the relay line 321 are also connected through the bore 293 to exhaust 299. The intermediate ratio line 322 and the low ratio line 323 are connected between the lands *b* and *c* of the valve element 292 to exhaust 307.

In a third ratio position the manual valve 291 connects the ratio supply line 283 between the lands *c* and *d* of valve element 292 to the high ratio line 311 and the front unit supply line 318 which is connected via branch 317 between the lands *b* and *c* of valve element 302 to the direct drive ratio line 316. The signal line 261, reverse line 319 and the relay line 321 remain connected to exhaust 299. The intermediate ratio line 322, low ratio line 323 and overdrive supply line 312 are connected between the lands *b* and *c* of manual valve element 292 to exhaust 307.

In the second ratio position the manual valve connects the ratio supply line 283 between the lands *c* and *d* of element 292 to the front unit supply line 318, which as in third ratio continues the supply to the direct drive ratio line 316 and also supplies fluid through the internal passage 296 of valve element 292 and the space between the lands *a* and *b* to intermediate ratio line 322. The low ratio line 323, the overdrive supply line 312, and the high ratio line 311 are connected to the exhaust 307 while the signal line 261, reverse line 319 and relay line 321 are connected to the exhaust 299.

In first ratio position the ratio supply line 283 remains connected between the lands *c* and *d* of valve element 292 and relay valve 301 to the direct drive ratio line 316 and supplies the signal line 261. Fluid also flows through the internal passage 296 in valve element 292 and the space between the lands *a* and *b* to the low clutch line 323. In this valve position intermediate ratio line 322 is connected to exhaust 300, the overdrive supply line 312 and the high ratio line 311 are connected to exhaust 307, and reverse line 319 and freeway line 321 are connected to exhaust 299.

In neutral the ratio supply line 283 supplies fluid between the lands *c* and *d* to the signal line 261 and the front unit feed line 318 which continues to supply through the relay valve 301 the direct drive ratio line 316. Since all the rear unit ratio lines are exhausted, the rear unit provides neutral. The intermediate ratio line 322 and low ratio line 323 are vented at exhaust 300, the overdrive supply line 312 and high ratio line 311 are vented at exhaust 307 and the reverse line 319 and relay line 321 are vented at exhaust 299.

In the normal or first reverse ratio (R1) position the manual valve 291 connects the ratio supply line 283 between the lands *c* and *d* of valve element 292 to the signal line 261, the reverse ratio line 319 and the front unit feed line 318 which is still connected by the relay valve 301 to the direct drive ratio line 316. The other lines are connected to exhaust; to wit, the intermediate ratio line 322 and low ratio line 323 to exhaust 300, the overdrive supply line 312 and high ratio line 311 to exhaust 307 and the relay line 321 to exhaust 299.

In the R2 position or second ratio reverse position the ratio supply line 283 is connected between the lands *c* and *d* of valve element 292 to the signal line 261, reverse ratio line 319, the relay line 321, and the front unit feed line 318. The relay line 321 is connected to the chamber 306 at the right end of the relay valve 301 and shifts the relay valve to the overdrive position in which fluid in the front unit feed line 318 is blocked at branch 317 by the land *c* and connected at branch 320 between the lands *a* and *b* to the overdrive ratio line 314. The direct drive clutch line 316 is then connected between lands *b* and *c*, overdrive supply line 312, and between the lands *b* and *c* of valve element 297 to exhaust 307. The intermediate and low clutch lines 322 and 323 are connected to exhaust 300, and the high ratio line 311 connected to exhaust 307.

The intermediate ratio line 322 is controlled by trimmer valve 326 to provide the initial low pressure for the initial stage of ratio establishing device application and a gradual increase in pressure to a final high pressure equal to main line pressure. The trimmer valve 326 has a stepped bore having a large portion 327 and a small portion 328 with a valve element 329 located in the small bore portion 328. The shoulder 331 engages the shoulder between the large and small bore portions so that the valve 329 will not engage the end of bore 328. The intermediate ratio line 322 is connected to a chamber 333 at the right end of the bore 328 and this clutch fluid acts on the end of valve 329 to urge the valve against the dual spring 334 to move the valve from the closed position shown to an open position connecting intermediate ratio line 322 to exhaust 336 to reduce the line pressure to the valve regulated by the springs 334. The bore 327 is provided with an exhaust 337 to prevent the accumulation of oil in the bore interfering with the operation of the valve. The intermediate ratio line 322 is also connected through an orifice 338 in the check valve 339 to the end of bore 327 where it acts on the abutment piston 341 to move the piston 341 to the right to increase the spring force acting on valve 329 and the pressure in the line 322. When the intermediate ratio line 322 is exhausted, the fluid acting on the piston 341 is exhausted rapidly from the end of bore 327 through the check valve 339 to position the valve 326 for a subsequent intermediate clutch application.

The converter supply line 244 supplies fluid from the pressure regulator valve 221 to the torque converter. Then the fluid flows from the converter to outlet line 346 to the converter outlet valve 347 which prevents high brake outlet pressure from line 359 flowing back to the converter and incidentally provides a low pressure differential; i.e., 10 p.s.i., between the torque converter and the cooler 348. Valve 347 is connected by line 351 to the cooler inlet line 352 from which fluid flows through the cooler 348 to the cooler outlet line 353. The cooler outlet line 353 supplies fluid from the torque converter to the hydrodynamic brake when the brake control valve 356 is in the brake-on position shown in Figure 5. The brake control valve 356 has a valve element 357 having lands a, b and c of equal diameter located in the bore 358 in the valve body. With the brake valve 356 in the brake-on position shown, the brake outlet line 359 is connected to annular port 361 between the lands a and b to the cooler inlet port 362 and line 352 to cooler 348. The fluid from the cooler passes through line 353 to cooler outlet port 363 between the lands b and c to the brake inlet port 364 and line 366 to supply fluid to the brake chamber 76 to apply the hydrodynamic brake. The brake outlet port 361 is also connected to a pressure relief valve 368. Since the torque absorbed by the hydrodynamic brake is proportionate to the pressure in brake outlet line 359, the valve 368 limits the torque absorbed by the brake by relieving excess pressure by venting the brake outlet flow from port 361 to a drain passage 369 which is connected by the tube 371, chamber 372, and passage 373 extending around land c of valve zone 357 to exhaust 374. The cooler outlet port 363 is connected by passage 376 concentric with tube 371 to an annular regulator valve 377 which regulates the brake inlet pressure. Valve 377 has an annular valve element 378 resiliently held against seat 379 by a spring 381 seated on an annular abutment 382 secured in the valve body between the chamber 372 and the passage 383 and providing a partition between these passages and a support for the lower end of the tube 371. When the pressure in the cooler outlet port 363 raises above a predetermined value, valve 377 opens and fluid is exhausted through passage 383 which extends around the land c to the exhaust 384.

When the valve element 357 is moved toward the brake-off position land a first uncovers the apex of triangular port 385 and then increasing areas of port 385 to provide a variable orifice connection from brake outlet line 359 to vent port 388. This variable orifice control provides auto-regulation of the torque absorbed by the brake at intermediate values since an increase in the torque absorbed will increase the outlet pressure and flow through the orifice to reduce the volume of fluid in the brake chamber, the outlet pressure and flow and the torque absorbed and a decrease in the torque absorbed will similarly increase the torque absorbed as explained in detail in the copending application Serial No. 555,847, filed December 28, 1955, by Howard W. Christenson et al. Seal 387 closes the upper opened end of the bore 358. There is a small clearance between the lands of valve 357 and bore 358 so that the fluid in the ends of the bore does not block movement of valve 357. When the valve element 357 is in the brake-off position with land a engaging stop ring 386, the brake outlet line 359 and port 361 are connected between the lands a and b without restriction to the vent port 388 which is connected via passage 369, tube 371, chamber 372, and passage 373 to exhaust 374 to fully evacuate the brake chamber. The land b blocks the connection between brake outlet port 361 and bore 358 so that the brake outlet line 359 is not connected to the cooler and also prevents oil from the cooler inlet line 352 entering the valve bore 358. The land c also blocks the connection between the cooler outlet port 363 and the brake inlet port 364 and thus stops the supply of fluid to the brake inlet line 366. Since the cooler outlet port 363 extends around the land c the cooler outlet line 353 remains connected to the passage 376 and relief valve 378 which will limit excessive converter outlet pressure by exhausting excess fluid to exhaust 384 as explained above.

Figure 7:
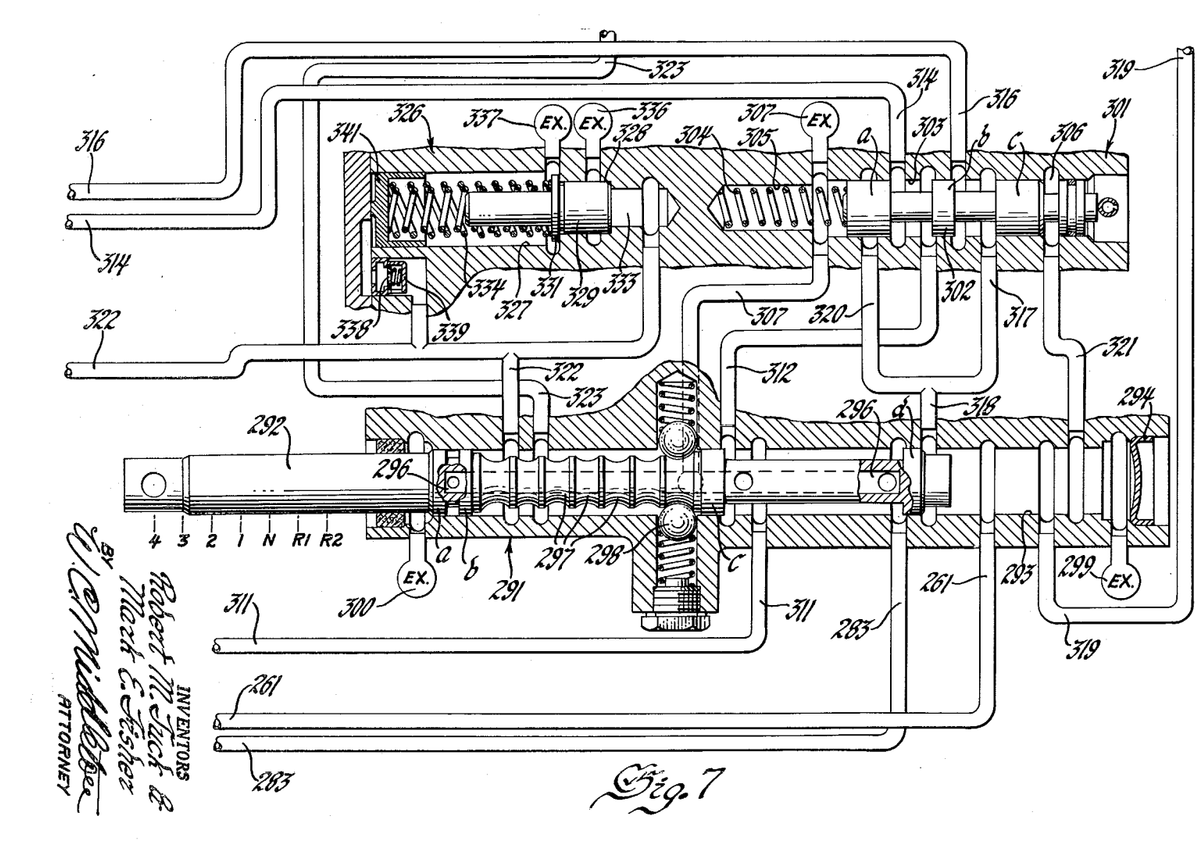

The manual and automatic controls for this transmission function to provide selection of four forward ratios and two reverse ratios in cooperation with automatic control for the lock-up clutch in the second, third and fourth ratios. The manual valve 291 in combination with relay valve 301 as explained in detail above, in fourth ratio supplies fluid to the overdrive ratio line 314 of the front or two speed unit 13 and to the high ratio line 311 of the rear or three speed unit 14 to provide a drive combining overdrive of the front unit and high of the rear unit. In the third ratio position the high ratio line 311 remains engaged and the direct drive device in the front unit is supplied by line 316 to provide a ratio combining direct drive in front unit and high ratio in rear unit. In the second and the first ratios the direct drive front unit remains engaged. The intermediate brake is engaged by line 322 in second and the low brake by line 323 in first. Thus second and first ratios provide in combination with direct drive in the front unit intermediate and low respectively in the rear unit. In neutral though direct drive in front unit remains engaged all ratios in the rear unit are disengaged. In both reverse ratios the reverse brake in the rear unit is engaged by fluid supplied by line 319. In the R1 ratio direct drive in the front unit is engaged while in the R2 ratio overdrive in the front unit is engaged. When the manual valve is in the first forward ratio, neutral and both reverse ratios a signal pressure is provided in line 261 which is connected to the lock-up clutch valve 266 and acts on the end of land a of the valve element 267 to urge the valve to the downshift position to insure that the lock-up clutch will be disengaged in these transmission ratios. The signal line is also connected to the regulator valve and acts to change the position of the control abutment 231 to move it from the normal position abutting the end closure 257 of bore 256 and move it against the stop shoulder 258 to increase the force of spring 229 on the valve element 227 to regulate the main line pressure in a higher range of values. Since the pitot governor, which is driven by the converter output shaft, supplies pressure via line 242 to the chamber 241 where it acts on the reduced end 239 of the valve element 227 to counteract the spring force acting on the valve, the main line pressure is reduced in proportion to increasing converter output speed or governor pressure. When, as the converter output speed increases, the main line pressure is reduced and the governor pressure increased to a substantially equal value, valve 289 opens connecting these pressures and both remain constant at higher speeds, preventing an excessive rise in governor pressure and excessive reduction in main line pressure. When pressure in signal line 261 moves control abutment 231, main line pressure is increased at all speeds as shown in Figure 4A.

The lock-up clutch valve 266 is held by the pressure in signal line 261 acting on land *a* of valve element 267 in first forward ratio, neutral and both reverse ratios in the disengaged position so that the lock-up clutch 11 cannot be engaged. In the second, third and fourth ratios at a predetermined speed equivalent to a normal second ratio driving speed the governor pressure in line 242 acting on land *b* of valve element 267 will upshift the valve to connect main line 234 to lock-up clutch line 271 to engage the lock-up clutch 11. If the lock-up clutch is engaged, it is disengaged during each ratio change between second, third and fourth ratios. When a ratio change device is being filled for the engagement of the new ratio, flow from the main line 234 through the orifice 282 to the ratio change line 283 reduces the pressure in line 283 to provide a pressure differential on the opposite ends of the valve 277 sufficient to cause the valve to move rapidly to the vent position. The valve 277 can move rapidly, since fluid in the bore 279 exhausts freely through the opened check valve 287. The valve 277 in the vent position connects the pitot governor line 242 to exhaust 284 and permits the spring 269 to return the lock-up clutch valve 267 to the downshift position disengaging the lock-up clutch 11. When the ratio change is substantially completed, as indicated by the fact that fluid flow through the orifice 282 to fill the motor has substantially ceased, the pressure in lines 234 and 283 equalizes. When the pressure equalizes in lines 234 and 283, the fluid pressure on both ends of the valve element 277 is equalized but due to the fact that land *a* has a larger area than land *c* the valve 277 will be moved right at a slow rate due to the fact that flow to the bore 279 is retarded by the orifice 286. Thus the shift or ratio change is entirely completed before the valve element 277 closes exhaust 284 to permit pitot pressure to build up in line 242 to actuate the lock-up valve 266 in accordance with converter output speed to reengage the lock-up clutch.

For the duration of each ratio shift the main line pressure is increased to the maximum pressure available in that ratio at zero speed to provide a high pressure for engaging the ratio clutch or clutches. Since the clutch plates are moving relative to each other during engagement the dynamic coefficient of friction is low, requiring a high pressure. When engagement is completed, the high static coefficient of friction permits use of a lower holding pressure. The main line pressure, controlled by regulator valve 221, is increased to the maximum value equivalent to zero converter output speed for the duration of each shift. This occurs since the flow value 276 as explained above vents the governor line 242 to exhaust 284 during each shift. The governor pressure, which normally acts on regulator valve 221 to reduce main line pressure, when exhausted permits main line pressure to reach its maximum value normally occurring at zero speed in each range of operation as shown in Figure 4A. When the shift is completed and the flow valve returns to the normal position, main line is again reduced by the governor pressure. If smoother clutch application is desired trimmer valves such as valve 326 may be used to control the pressure to each of the individual ratio establishing device motors.

The converter is supplied via line 244 and the outlet normally connected through line 346 and valve 347 to the cooler 348. From the cooler the converter outlet flow continues through the port 363 of the brake valve 356 to the regulator valve 377 which maintains an intermediate pressure; i.e., 22 p.s.i. at the cooler outlet and vents the excess fluid to exhaust 374. Due to the pressure drop in the cooler the converter outlet pressure will be substantially higher than this intermediate pressure. When the brake valve is in the brake-on position the converter outlet flow initially supplies the hydrodynamic brake via line 366. When the brake outlet pressure rises above the converter outlet pressure the valve 347 will close and fluid from the brake will not flow into the converter. The pressure in the brake inlet line 366 will be maintained at an intermediate value by the regulator valve 377 to assure flow to the brake chamber. In view of the fact that the brake chamber outlet is located radially outwardly from the brake chamber inlet, that the fluid pressure at the brake outlet and in line 259 is proportional to the square of the speed of the vanes 79 due to the centrifugal pressure rise effect and that the brake torque is proportional to the square of the speed of the vanes 79, the brake outlet pressure is proportional to brake torque. This pressure and brake torque are limited by the regulator valve 368 which limits the brake outlet pressure to a high value; i.e., 50 p.s.i., to prevent excessive torque absorption which would damage the drive train. The pressure drop across the cooler 348 permits a higher pressure at the cooler inlet due to the high flow when the brake is operating.

The above described embodiment is illustrative of the invention and it will be appreciated by those skilled in the art that modifications thereof may be made within the scope of the appended claims.

We claim:

1. In a transmission assembly, a multiratio gear unit selectively providing a plurality of drive ratios, fluid motor means to engage said drive ratios, a source of fluid under pressure, a regulator valve to control the pressure of said source, control means movable to a plurality of positions to selectively connect said source to said fluid motor means to selectively provide a plurality of ratios and to provide a signal pressure in certain ratios, means connecting said signal pressure to said regulator valve to change the pressure level of the regulated pressure, and a governor responsive to the input speed in said multiratio gear unit connected to said regulator valve effective on said regulator valve to vary the regulated pressure proportional to increasing speed.

2. The invention defined in claim 1, and said signal pressure increasing the regulated pressure and said governor pressure decreasing the regulated pressure proportional to increasing speed.

3. In a transmission assembly, a multiratio gear unit selectively providing a plurality of drive ratios, fluid motor means to engage said drive ratios, a source of fluid under pressure, a regulator valve to control the pressure of said source having a valve element located in a bore, said valve element having a first and second unbalanced area and being biased in one direction by a spring seated on a movable abutment and biased in the other direction by the fluid from said source acting on said first unbalanced area, control means movable to a plurality of positions to selectively connect said source to said fluid motor means to selectively provide a plurality of ratios and to provide a signal pressure in certain ratios, means connecting said signal pressure to said regulator valve to control the position of said movable abutment to change the pressure level of the regulated pressure, and a governor responsive to the input speed in said multiratio gear unit effective on said second unbalanced area of said regulator valve to vary the regulated pressure proportional to increasing speed.

4. In a transmission assembly, a multiratio gear unit selectively providing a plurality of drive ratios, fluid motor means to engage said drive ratio, a source of fluid under pressure, a regulator valve to control the pressure of said source having a valve element located in a bore, being biased in one direction by a spring seated on a movable abutment and said valve element having a first and second unbalanced area for biasing said valve in the other direction and biased in said other direction by the fluid from said source acting on said first unbalanced area, control means movable to a plurality of positions to selectively connect said source to said fluid motor means to selectively provide a plurality of ratios and to provide a signal pressure in certain ratios, means connecting said signal pressure to said regulator valve to control the position of said movable abutment to change the pressure level of the regulated pressure, and a governor responsive to the input speed in said multiratio gear unit effective on said second unbalanced area to bias said regulator valve in the other direction to vary the regulated pressure proportional to increasing speed.

5. In a transmission assembly, an input member, an output member, a fluid drive and a multiratio gear unit connected in series with said input and output members, a lock-up clutch connecting said input member to said multiratio gear unit, ratio change operating means to change the ratio of said gear unit, lock-up clutch operating means to engage said lock-up clutch, governor means, ratio control means to control said ratio change operating means to selectively engage said ratios, a lock-up clutch control means normally biased to the disengaged position and actuated by said governor to control said lock-up clutch operating means to engage said lock-up clutch, and shift responsive means operative in response to a change of ratio by said ratio control means and said ratio change operating means to prevent actuation of said lock-up clutch control means by said governor means during a ratio change thereby to disengage said lock-up clutch only during said change of ratio and to re-establish normal actuation of said lockup clutch control means with the completion of engagement of the ratio.

6. In a transmission assembly, an input member, an output member, a fluid drive and a multiratio gear unit connected in series with said input and output members, a lock-up clutch connecting said input member to said multiratio gear unit, ratio change fluid motor means to change the ratio of said gear unit, lock-up clutch fluid motor means to engage said lock-up clutch, governor means providing a pressure in a line proportional to the output speed of said fluid drive, a source of fluid under pressure, ratio change valve means selectively connecting said source to said ratio change fluid motor means to selectively engage said ratios, a lock-up clutch valve normally biased to the disengaged position and actuated by said governor pressure to connect said source to said lock-up clutch fluid motor means to engage said lock-up clutch, and means responsive to the flow of fluid from said source to said ratio change fluid motor means to interrupt the supply of governor pressure to said lock-up clutch valve to disengage said lock-up clutch.

7. The invention defined in claim 6, said means responsive to the flow of fluid venting said governor pressure in said line to interrupt the supply of governor pressure to said lock-up clutch valve.

8. The invention defined in claim 6, said means responsive to the flow of fluid being responsive quickly on the initiation of the flow of fluid from said source to said ratio change fluid motor means to interrupt the supply of governor pressure and being responsive a predetermined interval after the cessation of the flow of fluid from said source to said ratio change fluid motor means to re-establish the supply of governor pressure.

9. The invention defined in claim 6, and means to hold said lock-up valve in said disengaged position when said ratio change valve is selectively engaging one of said ratios.

10. The invention defined in claim 6, said means responsive to the flow of fluid from said source to said ratio change fluid motor means including a flow valve having a large area and a small area and having a vent position venting said line to exhaust said governor pressure and a normal position closing said vent to permit said line to supply governor pressure to said lock-up clutch valve, means connecting said source to said small area to move said flow valve to said vent position, an orifice between said source and said ratio change motor so that the pressure in said motor is reduced during flow of fluid to said motor, means connecting said ratio change motor to said large area to move said flow valve to said normal position having restricted flow to retard valve movement to said normal position and high rate flow for quick valve movement to said vent position.

11. In a control system, means defining an internal passage having a seat shoulder located between spaced portions of said passage, a second passage including a tube extending through said first passage, said tube having spaced portions sealed to spaced portions of said means on opposite sides of said seat shoulder, an annular valve element surrounding said tube, movably mounted on said tube, and sealed to said tube and biased to engage said seat shoulder to close said first passage and movable to open said first passage.

12. In a transmission assembly, a multiratio gear unit having a first unit providing a low and a high ratio and a second unit providing forward and reverse ratios connected in series, fluid motor means for each ratio of each unit, a source of fluid under pressure, a control valve having a feed for each ratio, a relay valve having a normal position connecting said first unit low and high feed to the first unit low and high motor means respectively and a reverse position reversing said connection, said control valve connecting said source to said second unit feed and motor means for forward in a forward position and connecting said source through said first unit low feed and said relay valve in said normal position and to one of said first unit motor means, and connecting said source to said second unit reverse motor means in first and second reverse position and in said first reverse position connecting said source through said first unit low feed and through said relay valve in said normal position to said first unit low motor means and in said second reverse position connecting said source to move said relay valve to said reverse position and connecting said source through said first unit low feed and through said relay valve and from said relay valve to said first unit high motor means.

13. In a transmission assembly, a multiratio gear unit having a first unit providing a low and a high ratio and a second unit providing low, high and reverse ratios connected in series, fluid motor means for each ratio of each unit, a source of fluid under pressure, a control valve having a feed for each ratio, a relay valve having a normal position connecting said first unit low and high feed to the first unit low and high motor means respectively and a reverse position reversing said connection, said control valve connecting said source to said second unit feed and motor means for low and high in first and both second and third positions respectively and connecting said source through said first unit low feed and said relay valve in said normal position and to said first unit low motor means in first and second positions and through said first unit high feed to said relay valve in said normal position and to said first unit high motor means in third position, and connecting said source to said second unit reverse motor means in first and second reverse positions and in said first reverse position connecting said source through said first unit low feed through said relay valve in said normal position to said first unit low motor means and in said second reverse position connecting said source to move said relay valve to said reverse position and connecting said source through said first unit low feed and through said relay valve and from said relay valve to said first unit high motor means.

14. In a transmission assembly, a multiratio gear unit having a first unit providing a low and a high ratio and a second unit providing low, intermediate, high and reverse ratios connected in series, fluid motor means for each ratio of each unit, a source of fluid under pressure, a control valve having a feed for each ratio, a relay valve having a normal position connecting said first unit low and high feed to the first unit low and high motor means respectively and a reverse position reversing said connection, said control valve connecting said source to said second unit feed and motor means for low, intermediate, and high in first, second, and both third and fourth positions respectively and connecting said source through said first unit low feed and said relay valve in said normal position and to said first unit low motor means in first, second, and third positions and through said first unit high feed to said relay valve in said normal position and to said first unit high motor means in fourth position, and connecting said source to said second unit reverse motor means in first and second reverse positions and in said first reverse position connecting said source through said first unit low feed and through said relay valve in said normal position to said first unit low motor means and in said second reverse position connecting said source to move said relay valve to said reverse position and connecting said source through said first unit low feed and through said relay valve and from said relay valve to said first unit high motor means.

15. In a transmission assembly, a multiratio gear unit selectively providing a plurality of drive ratios, fluid motor means to engage said drive ratio, a source of fluid under pressure, a regulator valve to control the pressure of said source, control means movable to a plurality of positions to selectively connect said source to said fluid motor means to selectively provide a plurality of ratios and to provide a signal pressure in certain ratios, means connecting said signal pressure to said pressure regulator valve to change the pressure level of the regulated pressure, a governor responsive to the input speed in said multiratio gear unit effective on said pressure regulator valve to decrease the regulated pressure proportionate to increasing speed, and means to limit the pressure decreasing effect of said governor on said pressure regulator valve to limit the decrease in the regulated pressure to a predetermined value.

16. In a transmission assembly, a multiratio gear unit having a first fluid motor means operative on the supply of fluid to establish a first drive ratio and a second fluid motor means operative on the supply of fluid to establish a second drive ratio, a source of fluid under pressure, a regulator valve to control the pressure of said source, control means connecting said source to said first fluid motor means in a first position and connecting said source to said second fluid motor means in a second position, governor means providing fluid pressure proportional to the speed of said multiratio gear unit, means connecting said governor pressure to said regulator valve to decrease said source pressure with increasing speed, a means responsive to the engagement of one of said fluid motor means to exhaust said governor pressure only for the duration of said engagement and to disable the pressure reducing effect of said governor pressure on said source pressure only for the duration of said engagement and effective on completion of said engagement to reconnect said governor pressure to said regulator valve.

17. In a transmission assembly, a multiratio gear unit having a first fluid motor means operative on the supply of fluid to establish a first drive ratio and a second fluid motor means operative on the supply of fluid to establish a second drive ratio, a source of fluid under pressure, a regulator valve to control the pressure of said source, control means connecting said source to said first fluid motor means in a first position and connecting said source to said second fluid motor means in a second position, governor means providing fluid pressure proportional to the speed of said multiratio gear unit, means connecting said governor pressure to said regulator valve to decrease said source pressure with increasing speed, a flow valve responsive to the flow of fluid to said fluid motor means to exhaust said governor pressure only for the duration of said flow and to disable the pressure reducing effect of said governor pressure on said source pressure only for the duration of said flow effecting a ratio change and effective on completion of said engagement to reconnect said governor pressure to said regulator valve.

18. In a transmission assembly, a multiratio gear unit having a first fluid motor means operative on the supply of fluid to establish a first drive ratio and a second fluid motor means operative on the supply of fluid to establish a second drive ratio, a source of fluid under pressure, a regulator valve to control the pressure of said source, control means connecting said source to said first fluid motor means in a first position and connecting said source to said second fluid motor means in a second position, governor means providing fluid pressure proportional to the speed of said multiratio gear unit, means connecting said governor pressure to said regulator valve to decrease said source pressure with increasing speed, means to limit the increase of said governor pressure with speed and the decrease of the pressure of said source pressure with speed, a flow valve responsive to the flow of fluid to said fluid motor means to exhaust said governor pressure only for the duration of said flow and to disable the pressure reducing effect of said governor pressure on said source pressure only for the duration of said flow effecting a ratio change and effective on completion of said engagement to reconnect said governor pressure to said regulator valve.

19. In a transmission assembly, a multiratio gear unit having a first fluid motor means operative on the supply of fluid to establish a first drive ratio and a second fluid motor means operative on the supply of fluid to establish a second drive ratio, a source of fluid under pressure, a regulator valve to control the pressure of said source, control means connecting said source to said first fluid motor means in a first position and connecting said source to said second fluid motor means in a second position, governor means providing fluid pressure proportional to the speed of said multiratio gear unit, means connecting said governor pressure to said regulator valve to decrease said source pressure with increasing speed, a check valve connecting said governor pressure to said source when said governor pressure slightly exceeds the pressure of said source to limit the increase of said governor pressure with speed and the decrease of said source pressure with speed, a flow valve responsive to the flow of fluid to said fluid motor means to exhaust said governor pressure only for the duration of said flow and to disable the pressure reducing effect of said governor pressure on said source pressure only for the duration of said flow effecting a ratio change and effective on completion of said engagement to reconnect said governor pressure to said regulator valve.

20. In a transmission assembly, a multiratio gear unit having a first fluid motor means operative on the supply of fluid to establish a first drive ratio and a second fluid motor means operative on the supply of fluid to establish a second drive ratio, a source of fluid under pressure, a regulator valve to control the pressure of said source, control means connecting said source to said first fluid motor means in a first position and connecting said source to said second motor means in a second position, governor means providing fluid pressure proportional to the speed of said multiratio gear unit, pressure control means connecting said governor pressure to said regulator valve to vary the pressure of said source with varying speed, and means responsive to the engagement of one of said fluid motor means to disable said pressure control means only for the duration of said engagement of said fluid motor means to disable the pressure varying effect of said governor pressure on the pressure of said source only for the duration of said engagement and effective on completion of said engagement to re-establish the action of said pressure control means to vary the pressure of said source with varying speed.

21. In a transmission assembly, an input member, an output member, a fluid drive and a multiratio gear unit connected in series with said input and output members, a lockup clutch connecting said input member to said multiratio gear unit, ratio change operating means to change the ratio of said gear unit, lockup clutch operating means to engage said lockup clutch, governor means, ratio control means to control said ratio change operating means to selectively engage said ratios, a lockup clutch control means normally biased to the disengaged position and actuated by said governor to control said lockup clutch operating means to engage said lockup clutch, and shift responsive means operative in response to a change of ratio by said ratio control means and said ratio change operating means to operatively disconnect said governor means from said lockup clutch control means to prevent actuation of said lockup clutch control means by said governor means during a ratio change thereby to disengage said lockup clutch only during said change of ratio and to re-establish normal actuation of said lockup clutch control means with the completion of engagement of the ratio.

22. In a transmission assembly, a multiratio gear unit selectively providing a plurality of drive ratios, fluid motor means to engage said drive ratios, a source of fluid under pressure, a regulator valve to control the pressure of said source, control means movable to a plurality of positions to selectively connect said source to said fluid motor means to selectively provide a plurality of ratios and to provide a signal pressure in certain ratios, means connecting said signal pressure to said regulator valve to change the pressure level of the regulated pressure, and a governor responsive to the speed of said multiratio gear unit connected to said regulator valve effective on said regulator valve to vary the regulated pressure proportional to increasing speed.

23. In a transmission assembly, a multiratio gear unit having fluid motor means operative on the supply of fluid to establish a drive ratio, a source of fluid under pressure, a regulator valve to control the pressure of said source, control means connecting said source to said fluid motor means in a first position and connecting said fluid motor means to exhaust in a second position, governor means providing fluid pressure proportional to the speed of said multiratio gear unit, pressure control means connecting said governor pressure to said regulator valve to vary the pressure of said source with varying speed, and means responsive to the engagement of said fluid motor means to disable said pressure control means only for the duration of said engagement of said fluid motor means to disable the pressure varying effect of said governor pressure on the pressure of said source only for the duration of said engagement and effective on completion of said engagement to re-establish the action of said pressure control means to vary the pressure of said source with varying speed.

24. In a transmission assembly, a multiratio gear unit having a first unit providing a first and a second ratio and a second unit providing a first and a second ratio connected in series, fluid motor means for each ratio of each unit, a source of fluid under pressure, a control valve having a feed for each ratio, a relay valve having a normal position connecting said first unit first and second feed to the first unit first and second motor means respectively and a second position reversing said connection, said control valve in a first position connecting said source to said second unit feed and motor means for said first ratio and connecting said source through said first unit first feed and said relay valve in said normal position and to one of said first unit motor means, and said control valve in a second and a third position connecting said source to said second unit second motor means and in said second position connecting said source through said first unit first feed and through said relay valve in said normal position to said first unit first motor means and in said third position connecting said source to move said relay valve to said second position and connecting said source through said first unit first feed and through said relay valve and from said relay valve to said first unit second motor means.

25. In a transmission assembly, a multiratio gear unit having a first unit providing a first and a second ratio and a second unit providing a first and a second ratio connected in series to provide on the engagement of one ratio in each unit a plurality of combined ratio drives, fluid motor means for each ratio of each unit, a source of fluid under pressure, a control valve having a position for each combined ratio drive, a feed line for each ratio motor means, a relay valve having a normal position connecting said first unit first feed to the first unit first motor means and a second position connecting said first unit first feed to said first unit second motor means, said control valve in a first position connecting said source to said second unit feed line and motor means for said first ratio, means connecting said source through said first unit first feed line and said relay valve in said normal position to said first unit first motor means, and said control valve in a second position connecting said source to said second unit feed line and motor means for said first ratio and connecting said source to move said relay valve to said reverse position connecting said source through said first unit first feed line and through said relay valve and from said relay valve to said first unit second motor means.

References Cited in the file of this patent

UNITED STATES PATENTS

| | | |
|---|---|---|
| 1,528,297 | Jones | Mar. 3, 1925 |
| 2,645,137 | Roche | July 14, 1953 |
| 2,667,085 | Ackerman | Jan. 26, 1954 |
| 2,693,711 | Kelbel et al. | Nov. 9, 1954 |
| 2,720,887 | Safford | Oct. 18, 1955 |
| 2,738,689 | Dodge | Mar. 20, 1956 |
| 2,766,639 | Rosenberger | Oct. 16, 1956 |
| 2,794,349 | Smirl | Jan. 4, 1957 |